United States Patent [19]
Wienand et al.

[11] Patent Number: 5,744,713
[45] Date of Patent: Apr. 28, 1998

[54] CONSTRUCTION FOR FASTENING AND CONTACTING RESISTOR ELEMENTS FOR A HOT FILM ANEMOMETER AND SENSOR ARRANGEMENT USING SUCH CONSTRUCTION

[75] Inventors: Karlheinz Wienand, Aschaffenburg; Marc Klammer, Heidelberg; Stefan Dietmann, Haiterbach; Christian Koch, Kleinostheim, all of Germany

[73] Assignee: Herheus Sensor-Nite GmbH, Hanau, Germany

[21] Appl. No.: 692,962

[22] Filed: Aug. 7, 1996

[30] Foreign Application Priority Data

Aug. 18, 1995 [DE] Germany .......... 195 30 413.6

[51] Int. Cl.⁶ .......................................... G01F 1/68
[52] U.S. Cl. .................... 73/204.26; 73/756; 439/630
[58] Field of Search ............... 73/204.22, 204.26, 73/756; 439/59, 79, 630, 632, 629

[56] References Cited

U.S. PATENT DOCUMENTS

| | | | |
|---|---|---|---|
| 4,966,037 | 10/1990 | Sumner et al. | 73/204.26 |
| 5,188,534 | 2/1993 | Bertho et al. | 439/629 |
| 5,396,795 | 3/1995 | Araki | 73/204.26 |
| 5,540,100 | 7/1996 | Von Berg | 73/756 |

FOREIGN PATENT DOCUMENTS

| | | |
|---|---|---|
| 0 147 831 A2 | 7/1985 | European Pat. Off. . |
| 0 447 596 B1 | 6/1994 | European Pat. Off. . |
| 29 25 975 A1 | 1/1981 | Germany . |
| 3604202 A1 | 8/1986 | Germany . |
| 3637541 A1 | 5/1988 | Germany . |
| 8903330.2 | 8/1989 | Germany . |
| 3829195 A1 | 3/1990 | Germany . |
| 3935778 A1 | 10/1990 | Germany . |
| 3135793 C2 | 3/1991 | Germany . |
| 0 471 316 A1 | 2/1992 | Germany . |
| 4122295 A1 | 1/1993 | Germany . |
| 2-120627 A | 7/1990 | Japan . |
| 6-13 201 A | 1/1994 | Japan . |
| 2 207 297 A | 1/1989 | United Kingdom . |

OTHER PUBLICATIONS

Communication of the Preliminary Search Report, French Patent Application No. 96 10 210, mailed Apr. 11, 1997.

*Primary Examiner*—George M. Dombroske
*Assistant Examiner*—Harshad Patel
*Attorney, Agent, or Firm*—Panitch Schwarze Jacobs & Nadel, P.C.

[57] ABSTRACT

In order to obtain a rapid response of resistor elements having a hot film in a sensor carrier of a hot film anemometer, the resistor elements are inserted into a drawer-like recess at one end of the sensor carrier. The resistor elements rest with one end on a three point contact and are held fast on the three point contact through tension by means of contact springs in the connection area of contact clamps. Heat transfer which is detrimental to exact measurements can be avoided by means of the three point contact.

8 Claims, 4 Drawing Sheets

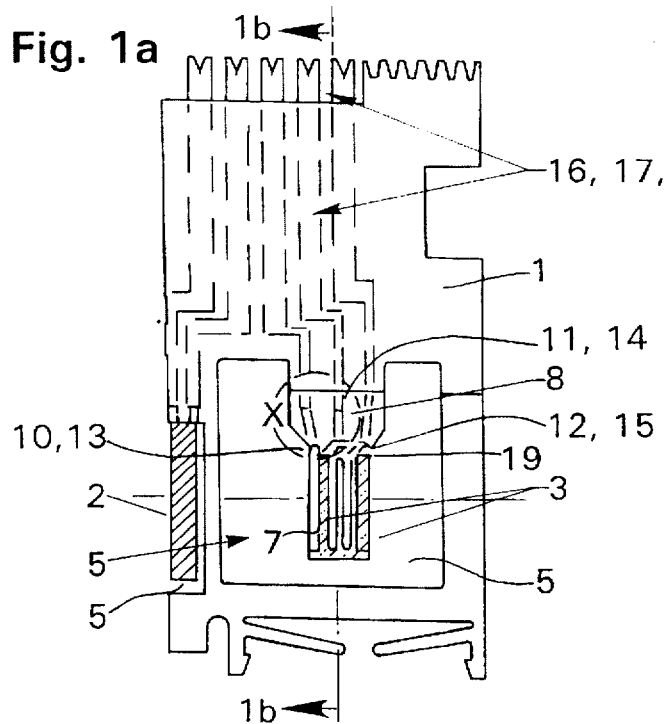
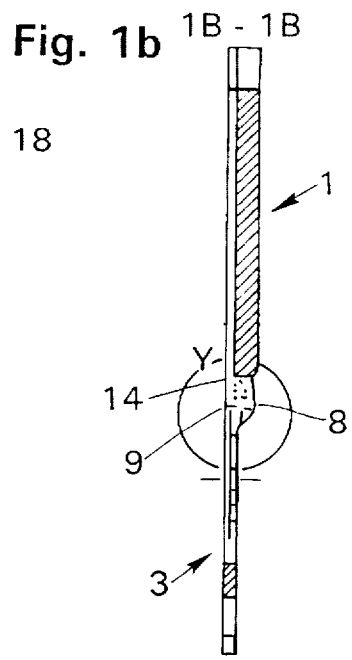
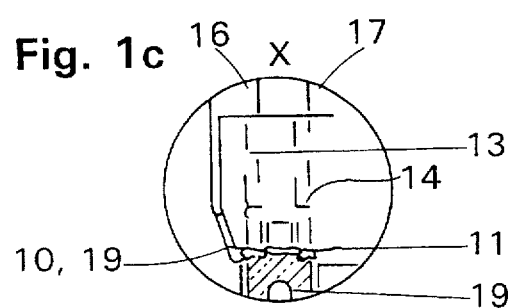
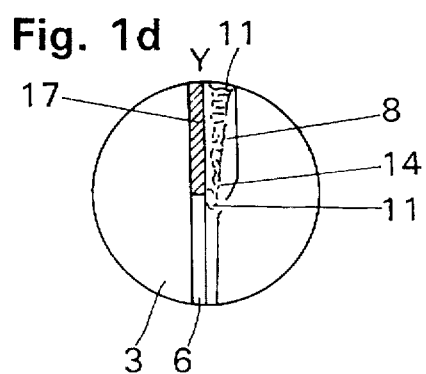

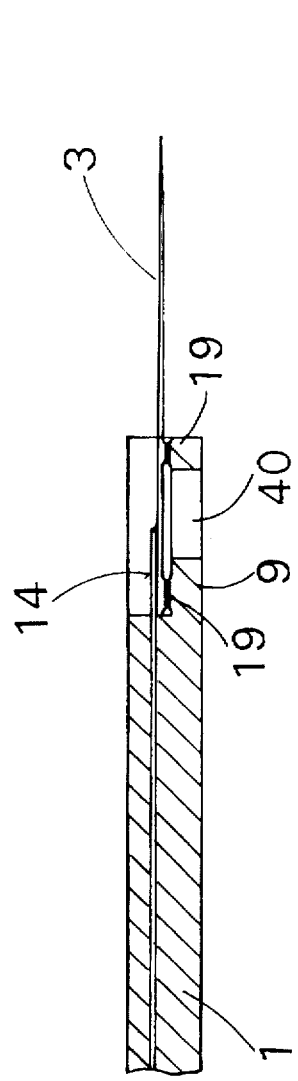
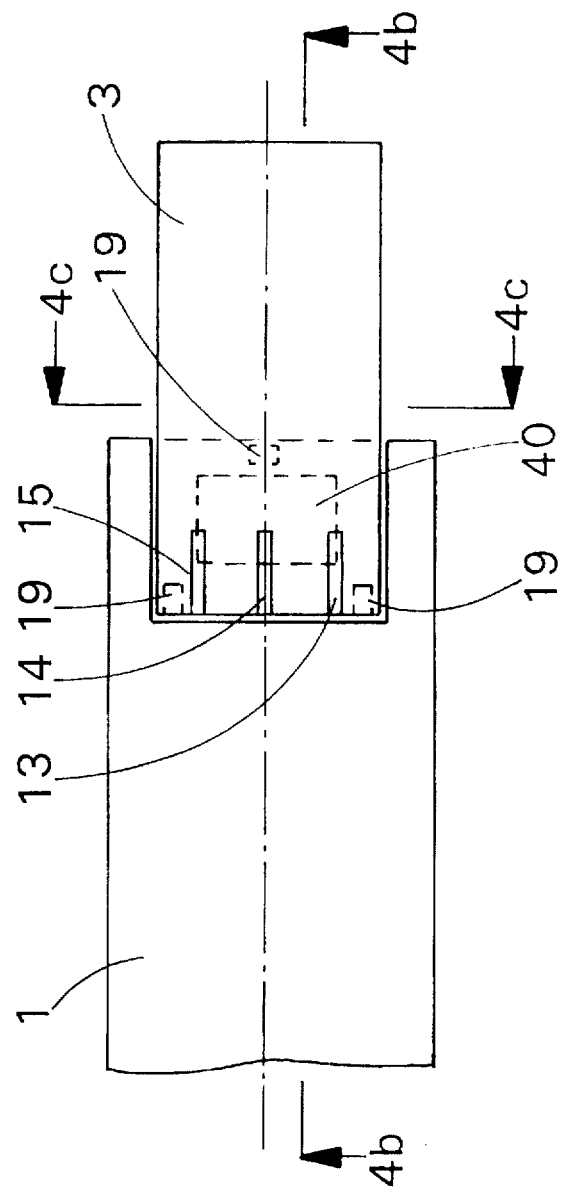
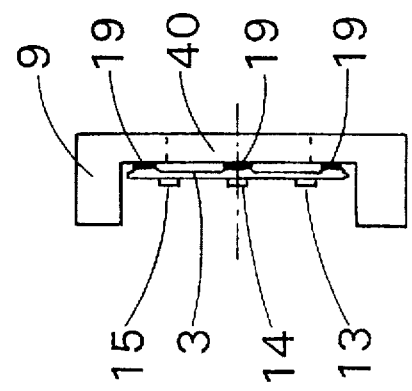

5,744,713

CONSTRUCTION FOR FASTENING AND CONTACTING RESISTOR ELEMENTS FOR A HOT FILM ANEMOMETER AND SENSOR ARRANGEMENT USING SUCH CONSTRUCTION

FIELD OF THE INVENTION

The invention concerns a construction for fastening and contacting resistor elements, which have a resistance layer in the form of a resistance line as a hot film located on a laminar, oblong substrate, to a laminar area of a sensor carrier of a hot film anemometer, as well as a sensor arrangement for a hot film anemometer.

BACKGROUND OF THE INVENTION

An air mass flow meter for the air intake of an internal combustion engine is known from DE 41 22 295 A1, which has a pipe housing with a Venturi pipe located in a section of the intake pipe, wherein a first resistor is installed in the Venturi pipe, the temperature and/or resistance of which is regulated by an electric circuit, whereby the controller output is a measure for the mass, and a second temperature-dependent resistor is installed in the Venturi pipe for temperature compensation. The first resistor is thereby constructed as a bridge in a frame-forming recess of a part of a chip carrier projecting into the Venturi pipe passage, while a U-shaped recess is provided upstream or downstream of the frame-forming recess, and the second resistor projects out as a bridge over the U-shaped recess.

In such an arrangement, the heat insulation of the resistor with respect to the mounting or the periphery surrounding it proves to be problematic, as does the difficulty of conducting an exact measurement of the air mass passing through with a pulsating flow.

A procedure for measuring the mass of pulsating medium flowing in a flow cross section is known from DE 31 35 793 A1, especially for measuring the intake air mass of internal combustion engines, in which the measuring signal which represents the flowing mass of medium is subject to influence as a function of the flow direction by determining the difference between resistance values of a temperature-dependent resistor and of one or two indication resistors.

Moreover, an air mass sensor with a pulsation recognition is known from DE 36 37 541 A1, wherein a heater is mounted between two heat sensors, so that depending on the flow direction a higher temperature is determined at any given time for the air flowing toward the temperature sensor from the heater. The flow direction can thus be established.

Furthermore, an air mass measuring device with pulsation recognition is known from DE 39 35 778 A1, in which two hot films are so arranged opposite each other that, depending on the flow direction, one of the hot films is completely blown against, while the other lies in the flow separation area. The measurement signal with the greater amount is then constantly used for evaluation.

A simplified thermal uncoupling of the heater and sensors of a hot film anemometer is known from DE-GM 89 03 330.1. Glass was selected as a carrier material of low heat conductivity, whereby the SMT (surface mounted technology) type of construction can be used for the layout.

A rapid temperature sensor for determining the temperature of a medium is known from DE 38 29 195 A1. A resistor element constructed as a film resistor is there mounted on a piece of glass ceramic, through which a membrane arises which uncouples the resistance layer very well.

In addition, a temperature sensor with a temperature-dependent measuring resistor applied as a layer to a substrate is known from EP 0 447 596 B1. The measuring resistor is protected against environmental influences by a covering layer, wherein the covering layer is covered with a protective layer of a weakly reactive metal, preferably platinum.

SUMMARY OF THE INVENTION

An objective of the present invention is to create a sensor arrangement for hot film anemometers which on the one hand makes possible economic production, while on the other hand also making possible a rapid response time through the use of carrier materials of low heat conductivity. The lowest possible heat transfer from the resistor element to the sensor carrier should be obtained thereby. Above and beyond this, the sensor arrangement should be largely insensitive toward corrosion and contamination, so that a long service life is obtained.

This objective is achieved according to the present invention by a construction for fastening and contacting resistor elements into a laminar region of a sensor carrier of a hot film anemometer of the type described above, wherein the resistor element has at least two connection contacts spaced from each other in a peripheral area of the resistor element, and the connection area in the laminar region of the sensor carrier has a contact clamp provided with contact springs for bonding and holding the connection contacts of the resistor element, wherein the resistor element with its connection contacts is inserted into a drawer-like recess of the sensor carrier in such a manner that the underside of the resistor element has three contact points arranged in a triangle which rests on elevations of the drawer-like recess, the connection contacts being soldered with the contact springs, whereby the resistance element is pressed on the elevations by tension of the contact springs exerted on its upper side.

In a preferred embodiment of the construction, a connection contact arranged at a respective end and a connection contact arranged on a center tapping of an M-shaped or meander-shaped resistance line of the resistor element are inserted in the allocated connection area of the contact clamp. The sensor carrier plate is constructed as a plastic injection molded part, wherein the contact springs provided for connection with the resistance element(s) are prepared on the ends of the connecting leads which are embedded in the carrier plate as a stamped element. A heat transfer from the resistor element to the connection area of the sensor carrier is largely suppressed through a punctiform contact of the underside of the end of the resistor element on three elevations of the drawer-like recess arranged in a triangle. The contact springs exert a pressure on the upper side by their tension in the area of the connection contacts of the resistor element, so that the end of the resistor element is pressed in a stable three point contact against the elevations of the recess. Following electrical and mechanical attachment by soldering of the connection contacts of the resistor element with the adjacent-lying contact springs of the contact clamp of the carrier plate, the entire contact area is filled in with epoxy glue, UV-hardened glue or silicone glue. This serves for anchorage as well as for corrosion protection.

In a preferred embodiment, glass material with a heat conductivity of 0.96 W/(m·°K) is used as a substrate. Heat capacity amounts to 977 J/(kg·°K).

In a further advantageous embodiment, glass ceramic material with a heat conductivity of 25.1 W/(m·°K) is used as a substrate, whereby this can be made very thin and owing to its good heat conductivity can be rapidly reheated in the event of a jump in load of the air mass.

The above objective is further accomplished according to the invention by a sensor arrangement for a hot film anemometer in which a laminar sensor carrier has a drawer-like recess for receiving the laminar, oblong hot film resistor element at one end and for electrically and mechanically bonding the resistor element with a three point contact on three elevations of the drawer-like recess, the three points being arranged in a triangle.

The high stability of the resistor element inserted at one end into the drawer-like recess proves to be especially advantageous. The contact is in addition stabilized by use of the tension of the contact springs.

Further advantageous refinements of the invention are described below and in the claims.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1a shows a sensor arrangement according to the invention with a resistor element with center tapping using glass which has a low heat conductivity, but a relatively high heat capacity.

FIG. 1b is a longitudinal section along line A—A in FIG. 1a;.

FIG. 1c shows an enlarged cutaway X from FIG. 1a;

FIG. 1d shows an enlarged cutaway Y from figure 1b;

FIGS. 2a and 2b illustrate the tolerance range of the angle between the planes of the sensor carrier and the substrate of the heating element, wherein FIG. 2a is a plan view of the three point contact, while FIG. 2b is a longitudinal section along the line A—A in FIG. 2a;

FIG. 3b is a longitudinal section along line A—A in FIG. 3a;

FIG. 3c is an enlarged cutaway X from FIG. 3a; and

FIGS. 4a, 4b and 4c are simplified diagrammatic views showing more clearly the three point contact for supporting the resistor element.

DETAILED DESCRIPTION OF PREFERRED EMBODIMENT

Figure 2B:
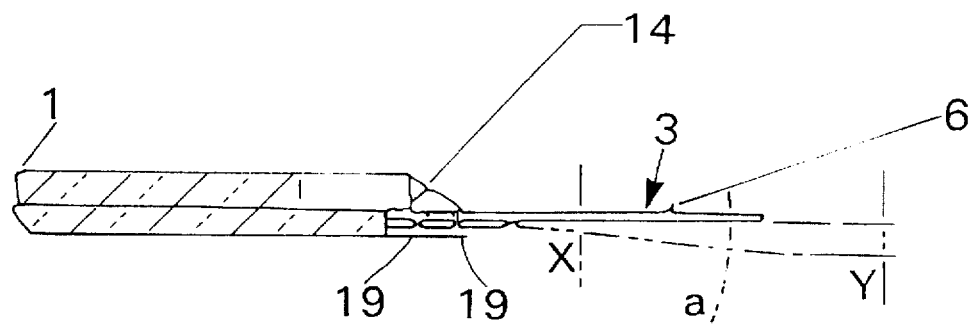

According to FIG. 1a, a sensor carrier for mounting the resistor elements is provided in the form of a frame-like carrier plate 1 of heat-resistant plastic, as is known from the above-mentioned DE 41 22 295 A1. The carrier plate has recesses 5 for receiving a temperature measuring resistor 2 as one resistor element, as well as a heating resistor 3 as second resistor element. The temperature measuring resistor (sensor) 2 consists of a conventionally available platinum thin layer temperature element.

The heating resistor 3 includes according to FIG. 1a and FIG. 1c a resistance layer 7 constructed in the form of a meander or a resistance line on glass which has a heat conductivity of 0.96 W/(m·°K) and a heat capacity of 977 J/(kg·°K). The thickness of the resistance layer 7 is about 0.7 to 2.0 μm; the thickness of the substrate 6 lies in the range of about 0.1 mm to 0.25 mm; the width of the substrate 6 lies in the range of about 1.9 mm to 4.0 mm; and its length lies in the range of about 4.0 to 16 mm. The contact area is provided with an electrically insulating cover 8 of epoxy glue.

The actual mounting of the heating resistor 3 in carrier plate 1 takes place by means of hollow sections constructed like drawers as locking or fastening areas 9, wherein the resistance element with its three connection contacts 10, 11, and 12 located in the peripheral area spaced from one another is bonded at three points by soldering with the corresponding contact springs 13, 14, and 15 of the contact clamps of the connecting leads 16, 17 and 18 lying on the carrier plate 1.

Figure 2A:
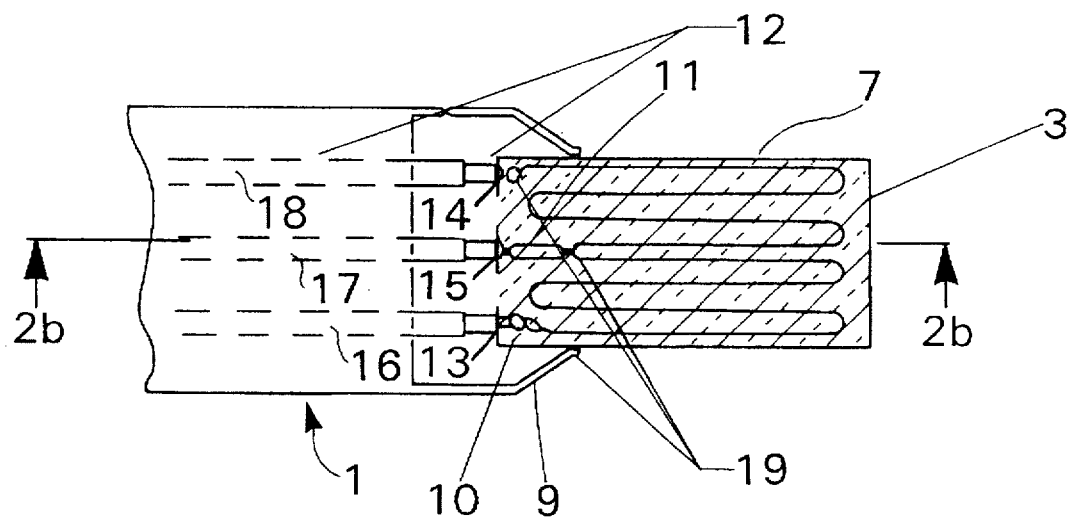

As can be seen from FIG. 2a, there is a so-called three point contact with three points 19 lying on elevations of the drawer-like recess 9 and with the three connection contacts 10, 11 and 12, which in accordance with the elevation view according to FIG. 2b result in an inclination angle α (between the plane of resistor 3 and the plane of carrier plate 1) in the range of 0° to 2°. In the section according to FIG. 1b the angle is shown for the ideal case of 0°.

The attachment of the connection contacts 10, 11 of the heating resistor 3 with the contact springs 13, 14 of the carrier plate 1 is seen in FIG. 1c, wherein the connecting leads 16, 17 are constructed of copper stampings. After creating the solder connection in accordance with FIG. 1a or FIG. 1c, the entire contact area is covered over with epoxy glue 8 in order to guarantee sufficient stability of the attachment as well as a sufficient protection from corrosion. The connection area of the heating resistor 3 with its connection contact 11 is seen in FIG. 1d, which is bonded by means of a soldered joint with the contact spring 14 of the connecting lead 17, which is constructed as a copper stamping, and wherein the entire soldered joint is covered by epoxy glue 8 for increasing the mechanical stability and resistance to corrosion.

Figure 3A:
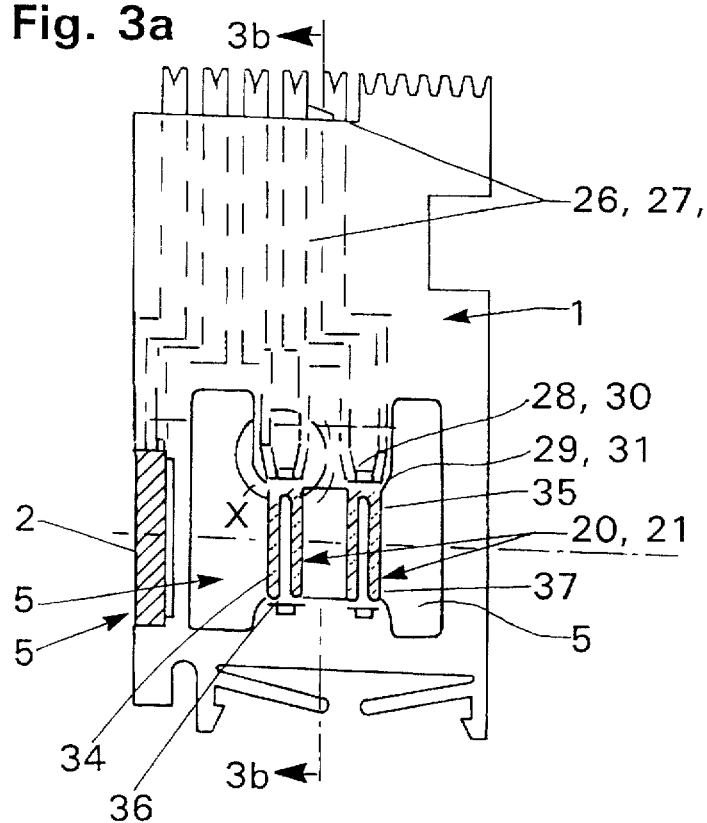
FIG. 3a is a plan view of a sensor carrier with two heating elements using glass ceramics, wherein the glass ceramic material has a comparatively high heat conductivity, but a low heat capacity.

FIG. 3a depicts a similar arrangement to that described in connection with FIG. 1a, 1b, 1c and 1d. The direction-dependent measurement is not, however, represented here by a resistor element with two components connected by a center tapping, but rather by two separate heating resistors 20, 21. The resistor element serving as heating resistor 20 has on one end two connection contacts 22, 23 lying adjacent to each other, which are provided with contact springs 24, 25 prepared for soldering in the end region of connecting leads 26, 27, wherein connecting leads 26, 27 are constructed as copper stampings in their end region.

Heating resistor 21 is connected in a similar manner by means of its connection contacts 28, 29 with the ends of the connecting leads 32, 33 constructed as contact springs 30, 31, wherein the connecting leads 32, 33 are likewise constructed as copper stampings (bond-pad). The resistance layers 34, 35 consist of a U-shaped or a meander-shaped, platinum functional layer which has a thickness of 0.7 μm to 2.0 μm, while the substrates 36, 37 of the heating resistors 20, 21 consist of a glass ceramic part with a heat conductance of 25.1 W/(m·°K) and a heat capacity of 190 J/(kg·°K). The thickness of the substrates 36, 37 lies in a range of about 0.1 mm to 0.25 mm range, their widths amount to about 1.9 to 4.0 mm, while their lengths lie a range of about 4.0 mm to 16 mm.

Figure 3B:
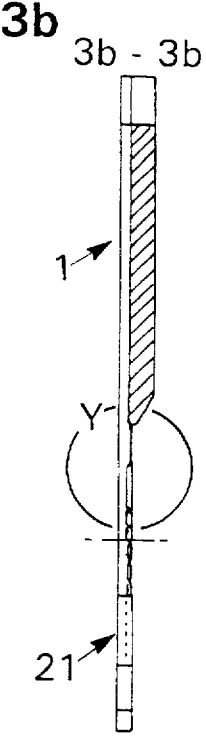
Figure 3C:
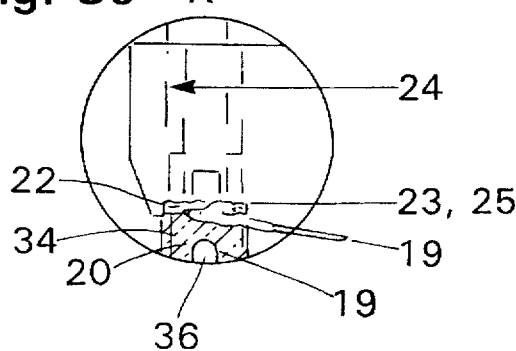
Figure 3D:
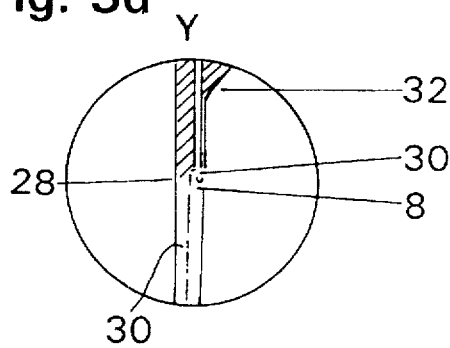
FIG. 3d is an enlarged cutaway Y from FIG. 3b.

FIG. 3c shows a detail marked X from FIG. 3a, in which the end of the heating resistor 20, which is provided with contact points 19, is shown with its connection to contact springs 24, 25. FIG. 3d shows an enlarged longitudinal section in accordance with detail marked Y of FIG. 3b, in which the contact point of the heating resistor 21 as well as the connection point can be seen. The principal construction thereby corresponds to FIG. 1b, as has already been explained above.

FIG. 4a is a simplified view of the attachment area of a resistor element 3 and carrier plate 1 similar to FIG. 2a, but without showing the connecting leads, resistance lines and other details of the carrier plate and resistor element. In FIG. 4a the resistor element 3 is shown from the top supported underneath by three contact or support points 19 which are elevated above the surface of the drawer-like recess 9 of the carrier plate 1. The resistor element 3 is held on top by the contact springs or clamps 13, 14 and 15 which are under tension or bias from their connecting leads to hold the resistor element 3 against the contact points 19 by pressure. This clamping of the resistor element 3 between the contact points 19 underneath and the contact springs 13, 14 and 15 from above is seen more clearly from the cross-sectional views in FIGS. 4b and 4c. Opening 40 in the drawer-like recess 9 of carrier plate 1 allows access to the resistor element 3 by a suitable mounting tool (not shown).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A construction for fastening and contacting resistor elements into a flat sensor carrier of a hot film anemometer, comprising at least one resistor element having a resistance layer in the form of a hot film resistance line formed on an oblong substrate and having at least two connection contacts spaced from each other in a peripheral area of said at least one resistor element, and a connection area in a sensor carrier for receiving said at least one resistor element, said connection area comprising a contact clamp provided with contact springs for bonding and holding said at least two connection contacts, the resistor element with its connection contacts being inserted into a drawer-like recess of the sensor carrier in such a manner that the underside of the resistor element has three contact points arranged in a triangle which rest on elevations of the drawer-like recess, the connection contacts being soldered with the contact springs, whereby the resistance element is pressed on the elevations by tension of the contact springs exerted on an upper side of the resistor element.

2. The construction according to claim 1, wherein the resistance line has an M-shaped or meander-shaped configuration and wherein one of said connection contacts is located at an end of said resistance line and another of said connection contacts is located at a central tapping of said resistance line.

3. The construction according to claim 1, wherein the contact springs are liftable prior to insertion of the resistor element and slowly lowerable following insertion of the resistor element into the connection area.

4. The construction according to claim 1, wherein the respective connection contacts are inseparably bonded with the corresponding contact springs through a melting procedure.

5. The construction according to claim 4, wherein the respective contact springs are bonded with the connection contacts by one of solder and an electrically conductive glue.

6. The construction according to claim 1, wherein a protective coating selected from the group consisting of epoxy glue, UV hardened glue and silicone glue is applied over the connection area for stabilization and corrosion protection.

7. A sensor arrangement for a hot film anemometer, comprising a measurement resistor and at least one flat, oblong hot film resistor element having at least one resistance layer formed on an extended substrate, said at least one resistor element being mounted in a drawer-like recess of a flat sensor carrier and joined electrically and mechanically therein, the at least one resistor element includes connection contacts and the sensor carrier includes contact springs for bonding and holding the connection contacts, said at least one resistor element being inserted with one end into the drawer-like recess and held therein with a three point contact on three elevations of the drawer-like recess, the three points being arranged as a triangle, wherein the resistor element is held against the three point contact by means of pressure on the connection contacts from the tension of the contact springs.

8. The sensor arrangement according to claim 7, wherein the connection contacts are joined with the contact springs by soldering.

* * * * *

UNITED STATES PATENT AND TRADEMARK OFFICE
CERTIFICATE OF CORRECTION

PATENT NO. : 5,744,713
DATED : April 28, 1998
INVENTOR(S) : Karlheinz Wienand et al.

It is certified that error appears in the above-indentified patent and that said Letters Patent is hereby corrected as shown below:

On title page, item [73], the Assignee should read -- Heraeus Sensor-Nite GmbH -- and not "Herheus Sensor-Nite GmbH".

Signed and Sealed this

Eleventh Day of August 1998

Attest:

BRUCE LEHMAN

*Attesting Officer*      *Commissioner of Patents and Trademarks*